US006591469B1

(12) United States Patent
Morin

(10) Patent No.: US 6,591,469 B1
(45) Date of Patent: Jul. 15, 2003

(54) BUSHING REMOVAL AND INSTALLATION TOOL

(75) Inventor: Michael G. Morin, Keene, NH (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/242,899

(22) Filed: Sep. 13, 2002

Related U.S. Application Data

(60) Provisional application No. 60/318,953, filed on Sep. 14, 2001.

(51) Int. Cl.[7] ............................ B23P 6/00; B23P 19/04

(52) U.S. Cl. ........................ 29/402.08; 29/244; 29/255; 29/256; 29/259; 29/264; 29/271; 29/426.4; 29/426.5; 29/724

(58) Field of Search ......................... 29/402.01, 402.08, 29/426.4, 426.5, 724, 244, 255, 256, 258, 259, 263, 264, 270, 271, 898.08, 898.07; 269/52

(56) References Cited

U.S. PATENT DOCUMENTS

| | | | | | |
|---|---|---|---|---|---|
| 1,381,101 | A | * | 6/1921 | Albertson | 29/263 |
| 1,443,052 | A | * | 1/1923 | Stephens | 29/250 |
| 1,544,246 | A | * | 6/1925 | Leslie | 29/255 |
| 2,741,022 | A | * | 4/1956 | Weaver | 29/244 |
| 2,859,456 | A | * | 11/1958 | Taylor | 29/244 |
| 3,124,870 | A | * | 3/1964 | Hugoson | 29/256 |
| 3,340,593 | A | | 9/1967 | Savastano | 29/262 |
| 3,383,755 | A | * | 5/1968 | Chmielewski | 29/264 |
| 3,403,434 | A | | 10/1968 | Calabro | 29/200 |
| 3,584,365 | A | * | 6/1971 | Cuen et al. | 29/256 |
| 3,863,322 | A | * | 2/1975 | Russell | 29/283 |
| 3,887,989 | A | * | 6/1975 | Maynard | 29/898.08 |
| 4,173,813 | A | * | 11/1979 | Stockinger | 29/266 |
| 4,207,664 | A | * | 6/1980 | Zoula | 29/264 |
| 4,437,220 | A | * | 3/1984 | Gregory | 29/426.5 |
| 4,586,229 | A | * | 5/1986 | Pendola | 29/252 |
| 4,624,041 | A | | 11/1986 | Gathright et al. | 29/263 |
| 4,665,602 | A | * | 5/1987 | Woodward et al. | 29/254 |
| 4,675,968 | A | * | 6/1987 | Bartlett | 29/254 |
| 4,724,608 | A | * | 2/1988 | Parrott | 29/724 |
| 4,769,890 | A | * | 9/1988 | Maynard | 29/259 |
| 5,165,169 | A | * | 11/1992 | Boyce | 29/898.08 |
| 5,226,208 | A | | 7/1993 | Gracey | 29/265 |
| 5,255,435 | A | * | 10/1993 | Shultz | 29/898.08 |
| 5,333,378 | A | * | 8/1994 | Sjobom | 29/898.08 |
| 5,373,636 | A | * | 12/1994 | Martinie | 29/898.08 |
| 5,509,186 | A | * | 4/1996 | Straut | 29/256 |
| 5,623,761 | A | * | 4/1997 | Chiang | 29/724 |

(List continued on next page.)

FOREIGN PATENT DOCUMENTS

GB 2 203 090 A * 10/1988 ........... B25B/27/28

*Primary Examiner*—Gregory Vidovich
*Assistant Examiner*—Essama Omgba
(74) *Attorney, Agent, or Firm*—Clifford F. Rey

(57) ABSTRACT

A special purpose tool for manual installation and removal of bushings or sleeve bearings from press fit bearing housings within automotive engines, transmissions, and other machinery with no resultant damage to the housing is disclosed. The present tool is comprised of a cylindrical body member including a pilot diameter, which aligns the tool in coaxial relation to the bushing and a bushing locating journal that engages the bushing to be removed. A plurality of machine screws are disposed in the body member at predetermined radial positions. To remove a bushing the machine screws are advanced axially within threaded holes such that the machine screw threads tap into and capture the worn bushing and/or bearing sleeve and the tool is withdrawn. The present tool is also utilized to manually install new bushings into housings and other components by removal of the aforementioned machine screws.

20 Claims, 3 Drawing Sheets

U.S. PATENT DOCUMENTS

| | | | | | |
|---|---|---|---|---|---|
| 5,727,298 | A | * | 3/1998 | Strong | 29/259 |
| 5,836,698 | A | * | 11/1998 | Richardson | 384/29 |
| 5,848,460 | A | | 12/1998 | Rasmussen et al. | 29/263 |
| 6,032,364 | A | * | 3/2000 | De Marchi | 29/898.08 |
| 6,085,402 | A | * | 7/2000 | Hill, Jr. | 29/402.03 |
| 6,092,279 | A | | 7/2000 | Shoup | 29/724 |
| 6,158,110 | A | * | 12/2000 | Takacs | 29/724 |
| 6,182,353 | B1 | * | 2/2001 | Grunze et al. | 29/724 |
| 6,212,775 | B1 | | 4/2001 | Sarver et al. | 29/898.08 |
| 6,401,338 | B1 | * | 6/2002 | Hill et al. | 29/898.08 |
| 6,415,491 | B1 | * | 7/2002 | Klann | 29/259 |
| 6,415,492 | B1 | * | 7/2002 | Jamison | 29/275 |
| 6,418,600 | B1 | | 7/2002 | Benoit | 29/263 |

* cited by examiner

BUSHING REMOVAL AND INSTALLATION TOOL

CROSS-REFERENCE TO RELATED APPLICATION

This patent application claims the benefit under 35 U.S.C. 119(e) of U.S. Provisional Patent Application No. 60/318,953 filed Sep. 14, 2001, entitled Bushing Removal and Installation Tool.

BACKGROUND OF INVENTION

The present invention relates to generally to special purpose tools and, more particularly, to a tool for manually removing and/or installing bushings and/or bearing sleeves from automotive transmission components and other machinery.

During a transmission overhaul, engine rebuild, or other similar repair procedure it is often necessary to remove and replace original equipment manufacture (hereinafter "OEM") bushings and bearings within major components, which support rotating shafts and assemblies. Typically such OEM bushings and/or bearings are pressed into a machined bore or recess at the factory to provide an interference fit. Once installed such bushings are difficult to accurately remove and replace without the factory tooling.

As a result such components are often damaged by mechanics using a makeshift tool causing damage to the bushing or the mating component. In the alternative, the worn bushing or bearing is left in place leaving excess clearance with the mating shaft and resulting in a substandard repair.

DESCRIPTION OF RELATED PRIOR ART

Numerous bearing removal tools or so-called bearing pullers for extracting bearings and/or bushings from machine housings are known in the prior art. One example of such a tool is shown in U.S. Pat. No. 4,624,041 which discloses a sleeve bearing puller including a pair of expandable and contractable half cylinder-shaped extractors and an expander mandrel between the extractors for grasping the bearing in response to a pull on the mandrel.

Another example of such a bearing removal tool is disclosed in U.S. Pat. No. 5,848,460 which discloses a bearing puller having a unique eccentric headed bolt and locking wedge such that when the eccentric head of the bolt is lockingly engaged to the bearing by means of the locking wedge and a wedge jam nut, the bearing is readily extractable by applying a load of sufficient magnitude to the bolt.

Another bearing removal tool is shown in U.S. Pat. No. 5,226,208, which discloses a split-nut, blind hole bearing puller made by using an elongated split nut with a bearing flange, which is assembled with the blind hole behind a bearing. A retainer fits over the assembled split nut so a puller bolt can be screwed through the assembled split nut into the blind hole to extract the bearing.

Other known prior art bearing extraction tools include U.S. Pat. No. 6,418,600 B1 to Benoit; U.S. Pat. No. 6,092,279 to Shoup; U.S. Pat. No. 6,212,775 B1 to Sarver et al; U.S. Pat. No. 3,340,593 to Savastano; and U.S. Pat. No. 3,403,434 to Calabro.

While these devices fulfill their particular objectives and requirements, the aforementioned patents do not disclose a bearing removal and installation tool, which is constructed in the manner of the present invention or which is as simple and inexpensive to manufacture.

SUMMARY OF THE INVENTION

Accordingly, the present invention provides a special purpose tool, which will facilitate removal and installation of bushings and/or sleeve bearings from press fit bearing housings of the type found within automotive engines, transmissions, and other machinery with no resultant damage to the housing. The present tool is comprised of a cylindrical body member including a pilot diameter, which aligns the tool in coaxial relation to the bushing and a locating journal that supports the bushing to be removed. A plurality of machine screws are disposed within mating threaded holes in the body member at predetermined radial positions corresponding to the interface of the locating journal and the bushing. To remove a bushing the machine screws are advanced axially within the threaded holes such that the machine screws cut partial mating threads into and capture the worn bushing and/or bearing sleeve for removal by an applied force. The present tool also provides an installation function being utilized to manually set new bushings into position using a suitable tool.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
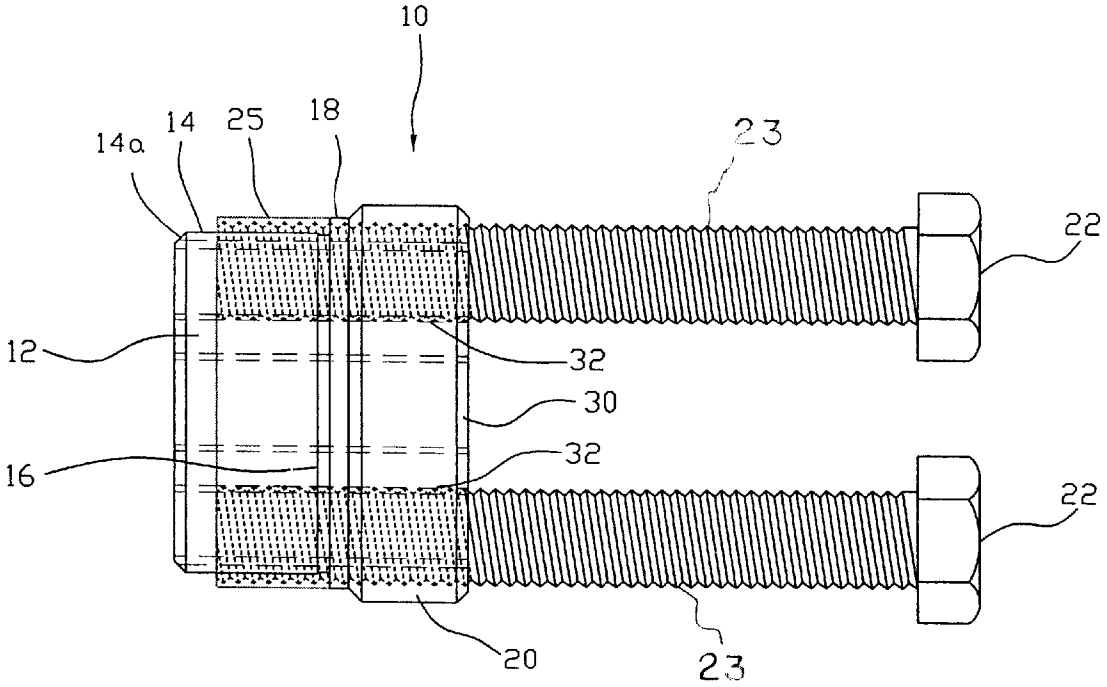
FIG. 1 is an elevational view of the bushing tool of the present invention.

With further reference to the drawings there is shown therein a bushing and/or sleeve bearing removal and installation tool in accordance with the present invention, indicated generally at 10 and illustrated in FIG. 1. For purposes of the present application the terms "bushing" and "sleeve bearing" are interchangeably being defined as cylindrical metallic linings that support, guide, and reduce friction between fixed and moving machine parts.

Tool 10 is comprised of a cylindrical body member 12 including a plurality of concentric diameters formed thereon. A locating journal 14 having a chamfered edge 14*a* is dimension ed to provide a slip fit with the inside diameter of a bushing 25 to be removed or installed as required. The locating journal 14 also includes a relief groove 16 formed at it s juncture with an adjacent shoulder diameter 18, which ensures that the end face of the bushing 25 abuts the shoulder diameter and is supported during the installation process as explained hereinafter the further in further detail.

The shoulder diameter 18 adjoins a pilot diameter 20, which is provided to align the bushing 25 with a cylindrical recess 55 (FIG. 4) within the component 50 wherein it resides during the removal and/or installation process.

Still referring to FIG. 1 it can be seen that the tool 10 is provided with a plurality of machine screws 22 for engagement with a plurality of mating threaded holes as at 30, 32 formed in the body member 12. In one embodiment, among others, standard ½-13 UNC-2B threads as at 40 are formed in the holes 30, 32. Of course, other thread sizes may be utilized for alternative applications of the present tool 10 for use with bushings of a different size and/or material.

It will be appreciated that the threaded holes 32 are drilled and tapped at predetermined radial locations in the body member 12 extending through the entire length thereof such that the threads 23 on machine screws 22 project slightly above the locating journal 14 when engaged in the body member 12 as shown in FIG. 1. Thus, it will be understood that in the present invention the threads 23 on machine screws 22 are employed to cut partial threads into the inside diameter of the worn bushing 25 thereby capturing it on the bushing tool 10 prior to removal. This is accomplished by manually advancing machine screws 22 in a clockwise direction (i.e. as viewed from the right end in FIG. 2B) with a wrench such that machine screws 22 effectively function as a thread tapping tool cutting partial threads in bushing 25 and simultaneously capturing it on the locating journal 14 for removal.

It will be understood that the present invention is adaptable to a wide range of bushing sizes and housing configurations. However, each such bushing application will require a bushing tool of a different configuration wherein the locating journal 14 and the pilot diameter 20 conform dimensionally to the particular bushing 25 and the housing wherein the bushing 25 resides. Of course, the radial locations of the threaded holes 32 will vary depending upon the diameter of the bushing 25 and the corresponding size of the locating journal 14 being utilized. Thus, the embodiment depicted in the drawings is intended as merely illustrative and not restrictive in any sense.

Figure 2A:
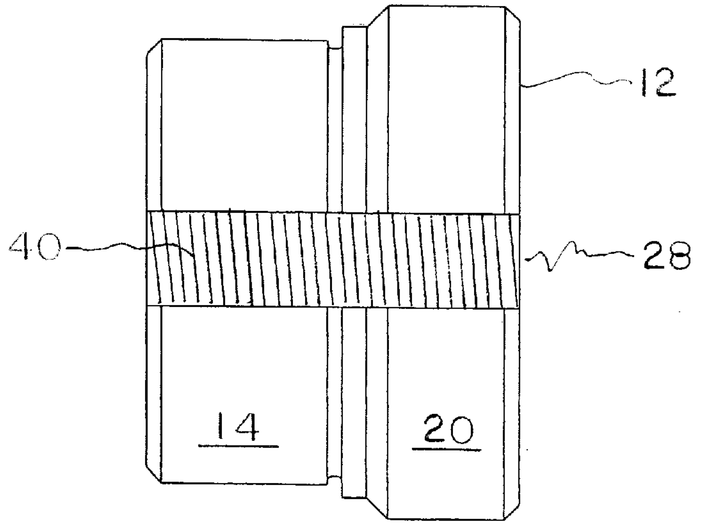
FIG. 2A is an elevational view of the body member of the present bushing tool.
Figure 2B:
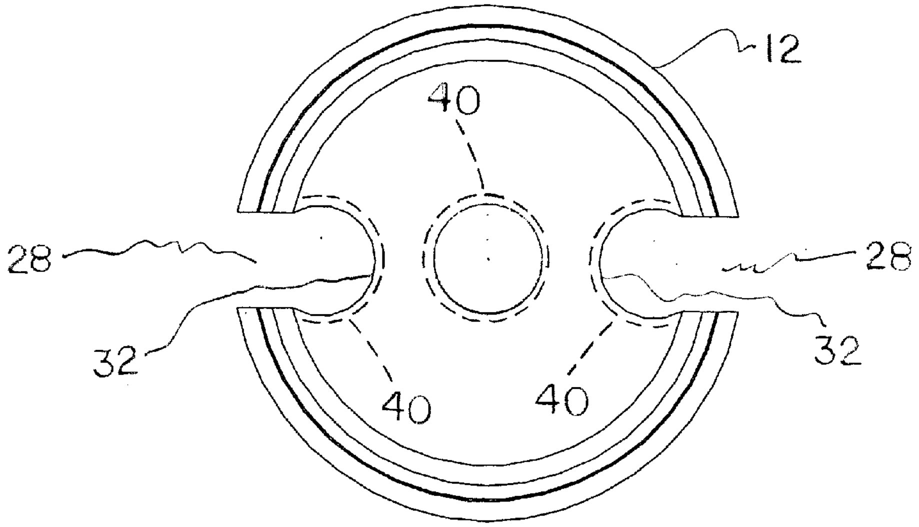
FIG. 2B is an end view of the body member of the present bushing tool shown with the machine screws removed illustrating the orientation of the threaded holes and slots.

As more clearly shown in FIGS. 2A and 2B, the body member 12 includes a plurality of slots as at 28 machined in parallel to and coincident with each threaded hole 32. Slots 28 function to provide a uniform surface at the juncture of the ½-13 UNC-2B threads with the journal diameter 14. More particularly, slots 28 are machined to ensure there is no jagged breakout of the threaded holes 32 at the juncture of locating journal 14, which would be prone to distortion and damage.

Figure 3:
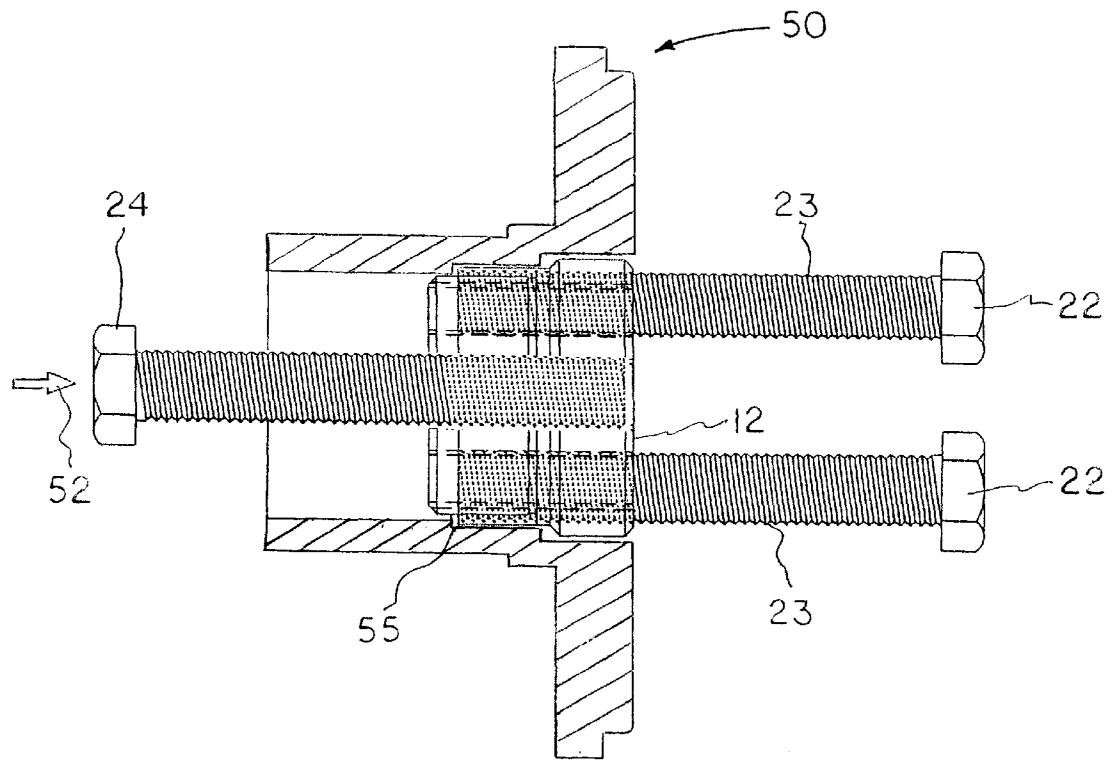
FIG. 3 is an elevational view showing the bushing tool being used in a removal procedure.

In a removal procedure using the present bushing tool 10, the body member 12 guided by pilot diameter 20 is inserted into a bushing 25 to be removed from its recessed location as at 55 within a component 50, for example, as shown in FIG. 3. Next, machine screws 22 are manually advanced into the mating threaded holes 32 to the approximate position shown in FIG. 1 using a suitable wrench. It will be understood that the bushing 25 is typically fabricated from a soft metal alloy having a relatively low hardness in comparison to machine screws 22. Thus, the threaded machine screws 22 easily tap into and form partial threads (not shown) on the inside diameter of the worn bushing 25 temporarily capturing it on the locating journal 14 for removal.

Next, an additional machine screw or so-called puller bolt 24 is threaded into the body member 12 from the opposite end as shown in FIG. 3. Thereafter, the bushing tool 10 is removed from the component 50 by an axial driving force applied to puller bolt 24 in the direction shown by arrow 52 with a hammer or a press (not shown).

Advantageously, the present bushing tool 10 can also be used to remove bushings 25 that are located in blind and/or counterbored recesses (not illustrated), which are not accessible from an opposite side of the component 50 as in the above example. In this instance the puller bolt 24 is inserted into the central threaded hole 40 from the opposite end (i.e. right end) of body member 12 and utilized to apply an axial pulling force to pull a worn bushing 25 from its installed location.

Figure 4:
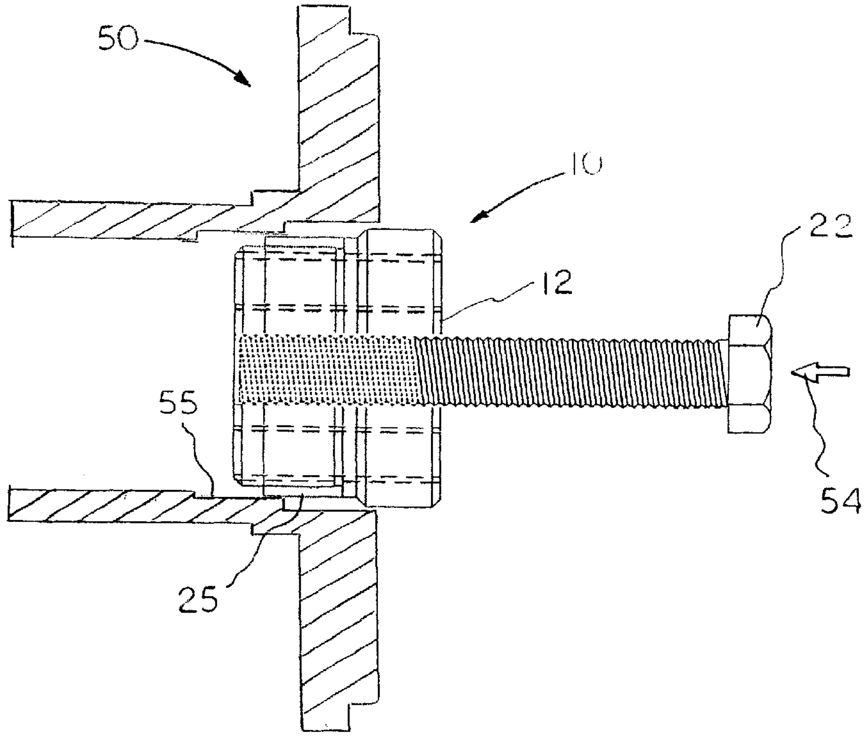
FIG. 4 is an elevational view showing the present bushing tool being used in an installation procedure.

To install a new bushing 25 into the component 50, machine screws 22 are removed from threaded holes 32 in the body member 12. Next, a new replacement bushing 25 is slidingly engaged on the locating journal 14 and positioned as shown in FIG. 4. Thereafter, the bushing tool 10 with the new bushing 25 mounted thereon is aligned with its recessed location within the component 50 or other housing and installed in the direction indicated by arrow 54 by tapping with a hammer or using an arbor press (not shown).

In one embodiment, among others, the present bushing tool 10 is fabricated from low carbon steel and hardened to HRC 50-54. A black oxide coating per MIL-C-134924C is applied to the bushing tool for preservation.

Thus, the present invention provides a special purpose tool, which facilitates removal and installation of bushings and/or sleeve bearings from press fit bearing housings and mating components of the type found within automotive engines, transmissions, and other machinery with no resultant damage to the housings. The present tool is comprised of a cylindrical body member including at least one pilot diameter, which aligns the tool in relation to the housing and at least one locating journal that engages the bushing to be removed or installed. A plurality of machine screws disposed in the present tool function to tap into and temporarily capture the worn bushing and/or bearing sleeve for removal. The present tool is also utilized to manually install new bushings into a housing using a suitable hammer or press.

Although not specifically illustrated in the drawings, it should be understood that additional equipment and structural components will be provided as necessary and that all of the components described above are arranged and supported in an appropriate fashion to form a complete and operative bushing removal and installation tool incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A bushing tool for removal and installation of cylindrical bushings within a mating housing, said bushing tool comprising:

a cylindrical body member having a longitudinal axis including at least one bushing locating journal formed thereon for sliding engagement with a cylindrical bushing;

a plurality of threaded holes extending axially through said body member in parallel relation to said axis at predetermined radial dimensions; and a plurality of machine screws having external threads formed thereon for mating engagement within said threaded holes such that when the bushing is radially disposed on said bushing locating journal and said machine screws are advanced axially in said threaded holes said external threads tap partial mating internal threads into the bushing whereby capturing it on said bushing tool for removal.

2. A bushing tool of claim 1 wherein said body member includes at least one pilot diameter of a predetermined dimension being disposed in concentric relation to said bushing locating journal for alignment of the bushing within a cylindrical housing for installation.

3. A bushing tool of claim 2 wherein said body member includes a threaded hole extending through said body member along said longitudinal axis for receiving a puller bolt therein for application of an axial pulling force to said bushing tool for removal of the bushing.

4. A bushing tool of claim 3 wherein said puller bolt also functions as a fixture for application of an axial driving force in a direction opposite to said axial pulling force for installation of the bushing.

5. A bushing tool of claim 1 wherein said body member includes a plurality of parallel slots formed at the juncture of each of said threaded holes with said bushing locating journal, said slots extending axially along the entire length of said body member coincident with said threaded holes.

6. A bushing tool for removal and installation of cylindrical bushings within a mating housing, said bushing tool comprising:

a cylindrical body member having a longitudinal axis including at least one bushing locating journal formed thereon for sliding engagement with a cylindrical bushing;

a plurality of threaded holes extending axially through said body member in parallel relation to said axis at predetermined radial dimensions; and bushing engaging means disposed within said threaded holes in said body member for temporarily securing the bushing to said bushing tool prior to its removal from the housing.

7. A bushing tool of claim 6 wherein said bushing engaging means further includes a plurality of machine screws having external threads formed thereon for mating engagement within said threaded holes such that when the bushing is positioned on said bushing locating journal and said machine screws are advanced axially in said threaded holes said external threads tap partial mating internal threads into the bushing thereby engaging it on said bushing tool for removal.

8. A bushing tool of claim 7 wherein said body member includes at least one pilot diameter of a predetermined dimension disposed in concentric relation to said bushing locating journal for alignment of the bushing within a cylindrical housing for installation.

9. A bushing tool of claim 8 wherein said body member includes a threaded hole extending through said body member along said longitudinal axis for receiving a puller bolt therein for applying an axial pulling force to said bushing tool for removal of said bushing.

10. A bushing tool of claim 9 wherein said puller bolt also functions as a contact fixture for application of an axial driving force in a direction opposite to said axial pulling force for installation of the bushing.

11. A bushing tool of claim 6 wherein said body member includes a plurality of parallel slots formed to a predetermined depth at the juncture of each of said threaded holes with said bushing locating journal, said slots extending axially along the entire length of said body member coincident with said threaded holes.

12. An improved bushing tool of the type including a cylindrical body member having a longitudinal axis, said body member including at least one coaxial bushing locating journal formed thereon for sliding engagement within a cylindrical bushing positioned in a mating housing, wherein the improvement comprises:

a plurality of threaded holes extending axially through said body member in parallel relation to said axis at predetermined radial dimensions; and bushing engaging means disposed within said threaded holes in said body member for capturing the bushing on said bushing tool prior to its removal from the housing.

13. An improved bushing tool of claim 12 wherein said bushing engaging means includes a plurality of machine screws having external threads formed thereon for mating engagement within said threaded holes such that when the bushing is radially disposed on said bushing locating journal and said machine screws are advanced axially in said threaded holes said external threads tap partial mating internal threads into the bushing temporarily engaging it on said bushing tool for removal.

14. A bushing tool of claim 13 wherein said body member includes at least one pilot diameter disposed in concentric relation to said bushing locating journal for aligning the bushing within a cylindrical housing for installation.

15. A bushing tool of claim 14 wherein said body member includes a threaded hole extending through said body member along said longitudinal axis for receiving a puller bolt therein for application of an axial pulling force to said tool for removal of said bushing.

16. A bushing tool of claim 15 wherein said puller bolt also functions as a fixture for application of an axial driving force in a direction opposite to said axial pulling force for installation of the bushing within the housing.

17. A method of replacing a worn cylindrical bushing disposed in a housing using a bushing removal and installation tool, said tool including a cylindrical body member having a longitudinal axis and a plurality of threaded holes extending axially through said body member in parallel relation to said axis at predetermined radial dimensions, said tool further including at least one coaxial bushing locating journal formed thereon for sliding engagement within the bushing, said method comprising the steps of:

aligning the longitudinal axis of said body member with said worn bushing;

inserting said locating journal into said worn bushing;

engaging said worn bushing on said locating journal;

withdrawing said worn bushing from said housing;

placing a replacement bushing onto said locating journal;

realigning the longitudinal axis of said body member with the housing; and installing said replacement bushing into the housing.

18. The method of claim 17 wherein the step of engaging further includes the steps of:

threading a machine screw of a predetermined length into each of said threaded holes from a first end thereof; and advancing said machine screws into contact with an inside diameter of said bushing such that said machine screws tap partial mating threads into said bushing temporarily capturing said bushing on said locating journal.

19. The method of claim 18 wherein the step of withdrawing further includes the steps of:

threading a puller bolt into a threaded hole formed along the longitudinal axis of said body member from an opposite end thereof; and applying an axial driving force to said puller bolt to forcibly remove said bushing from said housing.

20. The method of claim 18 wherein the step of withdrawing further includes the step of:

threading a puller bolt into a threaded hole formed along the longitudinal axis of said body member from said first end thereof; and applying an axial pulling force to said puller bolt to forcibly remove said bushing from said housing.

* * * * *

UNITED STATES PATENT AND TRADEMARK OFFICE

CERTIFICATE OF CORRECTION

PATENT NO. : 6,591,469 B1
DATED : July 15, 2003
INVENTOR(S) : Michael G. Morin

It is certified that error appears in the above-identified patent and that said Letters Patent is hereby corrected as shown below:

<u>Column 2,</u>
Line 51, after "are" insert -- used --.
Line 63, delete "the".
Line 63, delete "further" (1st occurrence).

<u>Column 4,</u>
Line 62, change "whereby" to -- thereby --.

Signed and Sealed this

Fourteenth Day of October, 2003

JAMES E. ROGAN
*Director of the United States Patent and Trademark Office*